United States Patent Office 3,503,313
Patented Mar. 31, 1970

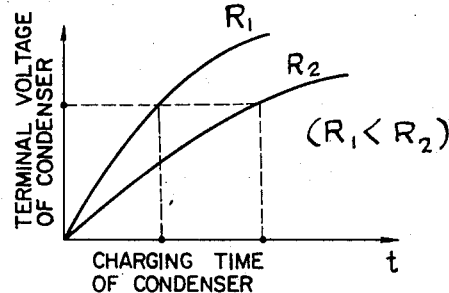
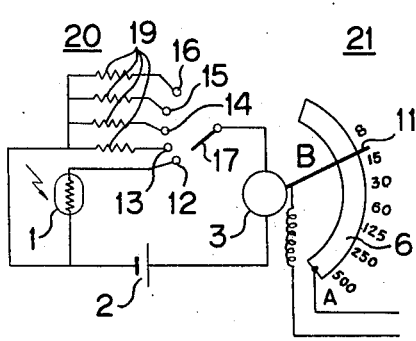
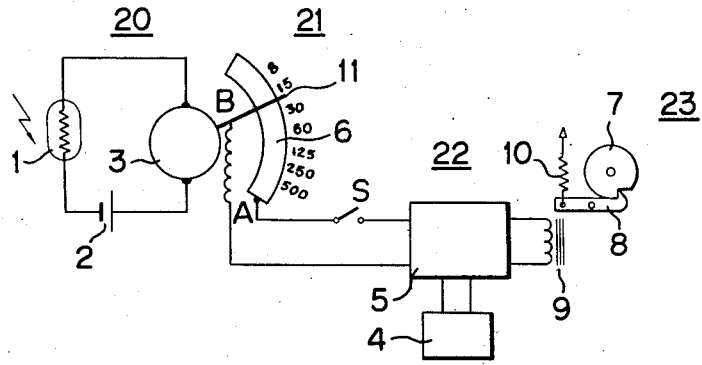
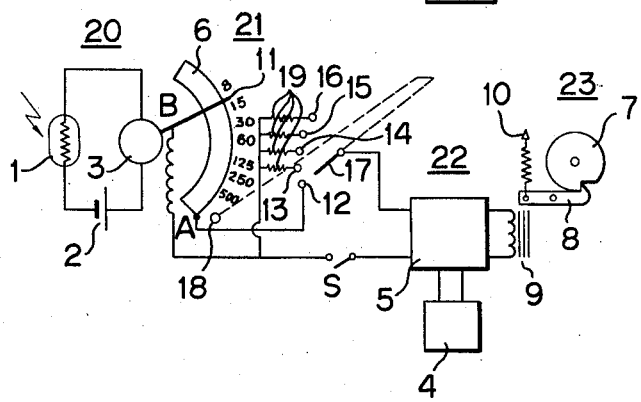

3,503,313
AUTOMATIC EXPOSURE CONTROLLING DEVICE
FOR FOCAL PLANE SHUTTER CAMERAS
Yoshio Kuramoto, Osaka, Japan, assignor to Minolta
Camera Kabushiki Kaisha, Minami-ku, Osaka, Japan,
a Japanese corporation
Filed May 27, 1966, Ser. No. 553,476
Claims priority, application Japan, June 11, 1965,
40/34,888
Int. Cl. G03b 7/08
U.S. Cl. 95—10          1 Claim

ABSTRACT OF THE DISCLOSURE

An automatic exposure control device for a camera in which light from a subject is measured by a behind-the-lens measuring system and the shutter speed thereof is electrically controlled by a timing circuit having an RC integral circuit. As the shutter is released, the resistance R of the RC integral circuit is either automatically selected corresponding to an angular position of an ammeter pointer on a resistor on which the pointer is pressed by a shutter button, the position being relative to an amount of light impinging on a cell, or manually selected by a resistance group disposed in parallel with the resistor through a manually setting member having a following pointer followed by the ammeter pointer.

---

The present invention relates to focal plane shutter cameras, and particularly to an automatic exposure control device in a camera having an exposure meter which measures the light beam passing through the photographing lens.

Hitherto, several types of automatic exposure control devices for cameras have been used. For instance, in a device in which degrees of a diaphragm opening for the photographing lens are automatically controlled in accordance with the brightness of the subject, the construction is such as to vary the diaphragm opening corresponding to the position of a movable pointer of the exposure meter by providing a lever or other means which mechanically detects deflections of said movable pointer of the exposure meter. Furthermore, in such devices for automatically controlling shutter speeds, there has been proposed an electronic controlled shutter wherein a photoconductive cell, for instance CdS (cadmium sulfide) the resistance of which is varied in dependence of the magnitude of light received, is directly arranged in an electronic circuit for controlling the shutter speed.

In said devices, when they measure the brightness of the subject, the photoelectric cell directly receives the light from the subject or receives the light passing through a condensing lens arranged in front of said photoelectric cell. Therefore, the photoelectric cell in these devices is always in the path of the light from the subject during a photographing operation.

However, recently there has come into being a system wherein the brightness of the subject is measured by means of a photoelectric cell which receives the light passing through the photographing lens (the so-called behind-the-lens measuring system). This has the advantage that the photoelectric cell can always receive light in an amount equal or proportional to that of the light passing through the photographing lens actually then being used in the camera. This has particular value in cameras with interchangeable lenses. Moreover, single lens reflex cameras are often so constructed that the light beam impinging on the photoelectric cell may be intercepted when the film is being exposed.

Therefore, it is necessary in such a camera to memorize the light value detected just before the light beam to the photoelectric cell is intercepted in order to automatically control exposure. It is possible to provide a lever or like means for mechanically detecting the position of the ammeter pointer and actuating said lever before the interception of the light to the photoelectric cell, whereby the diaphragm opening of the photographing lens is controlled in correspondence with the position of said ammeter pointer. This solution, however, is deficient in that the mechanisms for coupling the detecting lever with the means for controlling the diaphragm are very complex and require great accuracy of construction for each constituent part. The construction will be more complex with cameras having interchangeable lenses which mainly are focal plane shutter cameras, due to the fact that each lens has a respective diaphragm. The problem of the spatial limitation such as the relative position between the camera and the photographing lens must also be taken into consideration. Thus such solution is not feasible from a practical standard.

It will be appreciated that the method referred to above, i.e. in which the photoelectric cell is arranged directly in the electronic circuit which controls the shutter speed, cannot be employed in the case where the light beam is intercepted during the film exposure.

An object of the present invention is to provide a device capable of memorizing the light conditions just before interception of the light beam to the photoelectric cell in a camera in which the brightness of the subject is measured by the passage of light through the photographing lens and the light beam to the photoelectric cell is intercepted during the film exposure, so as to control the shutter speed for obtaining a proper exposure automatically.

Another object of the present invention is to provide such a device having an additional electronic circuit with which the shutter speed may be manually set.

A further object of the present invention is to provide such a device in which an exposure value, indicated by an ammeter pointer, can be obtained even when the shutter speed is manually set.

The present invention preferably uses an electromagnetically controlled shutter so as to simplify the construction and make the operation easy.

The invention will now be described in detail in connection with the attached drawing, wherein:

FIG. 1 is a graphical representation of the relation between the charging time of a condenser and the terminal voltage of the condenser;

FIG. 2 is a block diagram showing the construction of the present invention;

FIG. 3 is a diagram of an electric circuit according to the present invention for controlling the shutter speed automatically; and FIGS. 4 and 5 represent respective embodiments in which another electrical circuit is added to the circuit of FIG. 3, for manually selecting the shutter speed.

In FIG. 1 are shown the well-known relations between the voltage and time of exposure, which are obtained in an automatic exposure control mechanism having an RC integral switching circuit according to the direct light-receiving type.

In such cases, at the beginning of opening the shutter, a circuit switch is closed to charge the condenser C in said circuit through the resistance R (CdS) in case of the automatic exposure control system and when the charged potential reaches a predetermined value, the shutter is adapted to be closed. However, the situation is naturally different in the through the lens system in which the photoelectric cell is shunted out of the optical path or is blocked simultaneously with actuation of the shutter button. The photoelectric cell thus cannot be related with the above-mentioned charging operation, and furthermore, the photometrical capacity will be stopped during the exposure operation in such a type of mechanism, and as a result, automatic exposure control will be impossible.

According to the present invention, in a focal plane shutter camera, an automatic exposure control device for the behind the lens system, i.e. the system in which the light passing through the lens is detected for automatic exposure control, is intended an automatic exposure device for the through the lens system i.e. the system in which the light from the subject to be photographed passes through the photographing lens, to provide by the additional provision of a specific memorizing device, a construction in which a pointer relating to the light quantity detected by an ordinary light meter is allowed to deflect freely, without using the resistance of the light receiving photoelectric element for a photometer as a resistance in the RC integral switching circuit, and the movable pointer is firmly connected with a base-resistor at the indicated position by utilizing the shutter button, or under the action of mirror, and a selective resistance value obtained by the pointer serving as a memorizing device consisting of the pointer and base is incorporated into a part of the circuit, to constitute an appropriate resistance value for the RC integral switching circuit, thereby providing a shutter closing release device adapted to start under utilization of magnetic force.

This construction is shown in the block diagram of FIG. 2 which comprises an exposure detecting member 20, a memorizing member 21, RC integral switching member 22 and a release device 23 for closing shutter. Furthermore, a concrete embodiment of the present invention, as shown in FIG. 3, comprises a memorizing member 21 including a movable pointer 11 and a base resistor 6 for allowing contact of said pointer under pressure as well as a switch S which closes upon opening of shutter; the exposure-detecting member 2 includes a photoelectric element 1, a battery 2 and ammeter 3; the RC integral switching member 22 includes electrical source 4 and integral switching circuit 5, arranged relative the shutter closing release device 23, whereby a hook lever 8 engageable with the shutter closing member 7 is acted on by the magnet 9 consisting of a coil connecting said integral switching circuit and by the spring 10 operating in a direction reverse to that of said magnet. Said movable pointer 11 is enabled to correspond to a pushing member working in connection with a shutter button (not shown in the drawing) and the ASA correction for the sensitivity of various films is carried out, for instance, by shifting the base resistor 6 with the graduations thereon.

Thus, according to the above-mentioned construction, the pointer 11 of ammeter 3 indicates a value corresponding to the brightness of the subject to be photographed, and under action of light-receiving element 1, a front curtain (not-illustrated) will begin to move, when the shutter button (not-illustrated) is pushed. In concurrence therewith, the switch S is closed, and because the pointer 11 is in contact with the base resistor 6, the circuit has a resistance R which is proportional to the distance between the contact point A and fixed contact point B which is selected by the said movable pointer in accordance with the brightness of subject to be photographed. As a result, the condenser is charged for a period of time corresponding to resistance R as indicated in FIG. 1 by the integral switching circuit 5, and the time until the predetermined potential is reached, corresponds to the appropriate exposure time, i.e. the shutter speed. The magnetic circuit is interrupted when the predetermined potential is reached, and the attracting force of magnet 9 is terminated, whereby hook-lever 8 is pulled by spring 10 clockwise, with the result that the hook lever is disengaged and the shutter-closing member 7 is turned to operate the shutter-rear curtain (not illustrated) to complete the exposure. In magnet 9 shown in FIG. 3, the magnetic circuit will be cut off as the condenser reaches the predetermined voltage. However, the arrangement may be reversed and the magnetic circuit energized when the condensor reaches the predetermined voltage. Further, switch S may be closed electromagnetically instead of mechanically. The detailed construction of the parts will be readily evident to those skilled in the art.

When the shutter speed is selected by manually operated means as shown in FIG. 4, the exposure-detecting portion 20 is provided, with, for instance, stepwise fixed resistance 19 and its contact points 13, 14, 15 and 16, which are correspondent to an automatic exposure contact point 12 as well as with the movable contact member 17. In this case, the contact member may be moved to gradually change the value of the shutter speed as indicated by the movable pointed 11. FIG. 5 represents another embodiment of the apparatus relating to manual setting of the shutter speed and herein a hand-operated stepwise fixed resistance 19 and its contact points 13, 14, 15, 16 as well as movable contact piece 17 are provided in the memorizing member 21. When the movable pointer 11 is followed by the following pointer 18 or index, interlocked with the operation of movable contact piece 17 from the automatic exposure contact point 12, the shutter speed can be set. In this case, a shutter speed intentionally departed from the indicated value of the movable pointer 11 of ammeter 3 can also be obtained. Therefore: such device is valuable when the meters are inoperative because of insufficient light, or when meters are utilized for the counter-light photographing. Moreover instead of many stepwise fixed resistances as mentioned above, one resistor having a different resistance value due to a different circuit length can be utilized in the fashion of a slidable resistance, or numbers of contact points provided therein can be utilized in the fashion of a stepwise resistance.

As described before, generally when the shutter button is pushed down for the purpose of light measurement or photographing, a light receiving element is shunted from the optical passage, or shaded, the action is stopped. But, according to the present invention, the position occupied by the movable pointer which is displaced in accordance with the brightness of the subject to be photographed is memorized; and both said pointer and the base resistor connected with the pointer under pressure are included in the integral switching circuit and thus since the charging time for the condenser is related to the exposure time, in the behind the lens system, an automatic exposure control of high accuracy can be effected, and if necessary, manual exposure control can also be performed.

What I claim:

1. An automatic exposure control device for a camera having an exposure measuring system which measures the light passing through the photographing lens, said device comprising: a light detecting circuit including photoelectric element and an ammeter; a memory means including a pointer of said ammeter, a resistance member provided with a scale for indicating shutter speed, said pointer being adapted to abut said resistance member when a shutter release button is actuated, and an additional circuit including a plurality of resistances respectively having different resistance values and arranged in parallel, each of said resistances having a contact at the free end thereof, and a movable contact adapted to be manually actuated from outside the camera casing for connection with any selected one of said contacts, said movable contact having a following pointer coupled therewith so as to occupy an angular position along said resistance member corresponding to the movement of said movable contact, whereby manual shutter speed setting is made possible in addition to automatic shutter speed setting; an electronic timing means including an electrical source and an integral circuit with a condenser to provide a time delay circuit together with said pointer and said resistance member so that when a switch in said circuit is closed simultaneously with actuation of the shutter button, the condenser of said integral circuit is charged, at a time rate proportional to the automatically or manually selected resistance, to a predetermined potential; and a release means adapted to be actuated with said electric potential to close the shutter.

References Cited

UNITED STATES PATENTS 3,060,823 10/1962 Nelson.
3,063,354 11/1962 Matulik et al.
2,179,717 11/1939 Fedotoff _____ 95—10
2,978,970 4/1961 Fahlenberg _____ 95—10

NORTON ANSHER, Primary Examiner

JOSEPH F. PETERS, JR., Assistant Examiner